US012579458B2

(12) United States Patent
North

(10) Patent No.: US 12,579,458 B2
(45) Date of Patent: Mar. 17, 2026

(54) QUANTUM COMPUTING

(71) Applicant: Universal Quantum Ltd, Brighton (GB)

(72) Inventor: Richard North, Brighton (GB)

(73) Assignee: Universal Quantum Ltd, Brighton (GB)

( * ) Notice: Subject to any disclaimer, the term of this patent is extended or adjusted under 35 U.S.C. 154(b) by 99 days.

(21) Appl. No.: 18/599,043

(22) Filed: Mar. 7, 2024

(65) Prior Publication Data

US 2024/0296363 A1 Sep. 5, 2024

Related U.S. Application Data

(63) Continuation of application No. PCT/GB2022/052298, filed on Sep. 9, 2022.

(30) Foreign Application Priority Data

Sep. 9, 2021 (GB) ...................................... 2112871

(51) Int. Cl.
 *G06N 10/20* (2022.01)
 *G06F 1/08* (2006.01)
 *G06F 1/12* (2006.01)
(52) U.S. Cl.
 CPC ............... *G06N 10/20* (2022.01); *G06F 1/08* (2013.01); *G06F 1/12* (2013.01)
(58) Field of Classification Search
 CPC ............... G06F 1/08; G06F 1/12; G06N 10/20
 See application file for complete search history.

(56) References Cited

U.S. PATENT DOCUMENTS

| | | | |
|---|---|---|---|
| 6,535,989 B1 | 3/2003 | Dvorak et al. | |
| 10,148,275 B1 * | 12/2018 | Pi | H03L 7/104 |
| 10,635,990 B1 * | 4/2020 | Park | G11C 27/024 |
| 2004/0124892 A1 * | 7/2004 | Diorio | H03K 5/135 |
| | | | 327/112 |
| 2015/0293393 A1 | 10/2015 | Kim et al. | |
| 2016/0293393 A1 | 10/2016 | Gordon et al. | |

(Continued)

FOREIGN PATENT DOCUMENTS

| | | |
|---|---|---|
| WO | WO-2022123268 A2 | 6/2022 |
| WO | WO-2022123269 A1 | 6/2022 |
| WO | WO-2023275556 A1 | 1/2023 |

(Continued)

OTHER PUBLICATIONS

Kaushal, V., et al. Shuttling-based trapped-ion quantum information processing. AVS Quantum Science, vol. 2, 1-25 (2020).

(Continued)

*Primary Examiner* — Terrell S Johnson
(74) *Attorney, Agent, or Firm* — Wilson Sonsini Goodrich & Rosati

(57) ABSTRACT

According to the invention, there is provided a timing system for an ion trap quantum computer comprising a clock outputting a timing signal of period t, a plurality of delay lines coupled to the clock and each configured to input a different delay of less than t and a delay selection mechanism configured to select the delay wherein the delay by each of the delay lines is a different fraction of the period t.

29 Claims, 3 Drawing Sheets

(56) References Cited

U.S. PATENT DOCUMENTS

| | | |
|---|---|---|
| 2021/0026162 A1 | 1/2021 | Apisdorf et al. |
| 2024/0297662 A1 | 9/2024 | North |

FOREIGN PATENT DOCUMENTS

| | | |
|---|---|---|
| WO | WO-2023007189 A1 | 2/2023 |
| WO | WO-2023007190 A1 | 2/2023 |
| WO | WO-2023037124 A1 | 3/2023 |
| WO | WO-2023037126 A1 | 3/2023 |

OTHER PUBLICATIONS

Mount, Emily, et al. Scalable Digital Hardware for a Trapped Ion Quantum Computer. Quantum Information Processing, vol. 15, 5281-5298 (2015).

PCT/GB2022/052298 International Search Report and Written Opinion dated Mar. 16, 2023.

Akhtar, M. et al. A high-fidelity quantum matter-link between ion-trap microchip modules. arXiv preprint arXiv:2203.14062v1 (Mar. 26, 2022). 8 pages.

Akhtar, M. et al. A high-fidelity quantum matter-link between ion-trap microchip modules. arXiv preprint arXiv:2203.14062v2 (Apr. 5, 2022). 8 pages.

Akhtar, M. et al. A high-fidelity quantum matter-link between ion-trap microchip modules. arXiv preprint arXiv:2203.14062v3 (Nov. 20, 2022). 10 pages.

Akhtar, M. et al. A high-fidelity quantum matter-link between ion-trap microchip modules. Nature Communications 14(1):531, 1-8 (2023).

GB2112871.5 Office Action with Search Report dated Jun. 24, 2022.

GB2112875.6 Office Action with Search Report dated Jun. 14, 2022.

Lekitsch, Bjoern, et al. Blueprint for a microwave trapped ion quantum computer. Science Advances 3.2 (2017): e1601540. 11 pages.

PCT/GB2022/052296 International Preliminary Report on Patentability dated Mar. 21, 2024.

PCT/GB2022/052296 International Search Report and Written Opinion dated Dec. 8, 2022.

PCT/GB2022/052298 International Preliminary Report on Patentability dated Mar. 21, 2024.

* cited by examiner

QUANTUM COMPUTING

CROSS-REFERENCE

This application is a continuation of international application PCT/GB2022/052298, filed Sep. 9, 2022, which claims the benefit of GB Application No. 2112871.5 filed on Sep. 9, 2021, which applications are each incorporated herein by reference in its entireties.

FIELD

The present invention relates to providing a precision timing ion trap quantum computer.

BACKGROUND

Quantum computing, in general, unlike so-called "classical computing", relies on the quantum mechanical properties of particles or matter to produce or alter data. The data may be represented by quantum bits or "qubits", which are a two-state quantum mechanical system. Unlike classical computing, the qubit may be in superposition of quantum states. Another feature of quantum computing is the entanglement between qubits in which the state of one particle or atom is influenced by another particle or atom.

Quantum mechanical qubits are able to encode information as combinations of zeros and ones simultaneously. Such properties open numerous complex numerical applications that are traditionally difficult for classical computers. Examples include artificial intelligence, image processing and recognition, cryptography, or secure communications and so on.

Within an ion hyperfine, electronic states (Zeeman split states) can be revealed by the use of a magnetic field, the different electron levels used as the different qubit states, and electrons moved between the levels using microwave radiation or lasers.

SUMMARY

In ion trap quantum computers (quantum charged coupled devices), ion traps can be used to control ions used in quantum computation and surface electrodes are used to generate electric fields to manipulate and trap the ions suspended in free space. The surface electrode potentials of an ion-trap are in turn controlled by DACs. State-of-the-art quantum computers use many DACs of the same type, for example, 16-bit DACs with a better than 1 MHz update rate.

Each individual electrode is independently controllable, and each electrode has a corresponding DAC coupled thereto. The timing at which the electrode voltage is set must be carefully controlled and a clock signal is transmitted to each DAC to ensure that the timing of DAC signals is carefully controlled.

Clock signals within a quantum system often update at a rate of 1 MHz. Thus, signals to electrodes can be updated only every 1 μs. However, for diabatic movements it is necessary to update signals at a greater degree of accuracy than every $10^{-6}$ s.

For diabatic shuttling, an electrode voltage must be applied at a time to match the ion oscillation phase or in such a way to precisely add or remove a momentum impulse to the ion. If the electrode voltage is not applied at the correct time, additional oscillation and therefore motional noise will arise.

It is therefore an aim of the present invention to allow diabatic shuttling with reduced motional noise.

According to the invention, there is provided an ion trap quantum processor comprising an ion trap comprising a plurality of DACs, each coupled to an electrode, the ion trap having a motional (secular) trap frequency of period t, a clock outputting a timing signal of period T, a plurality of delay lines coupled to the clock and each configured to input a different delay of less than t and a delay selection mechanism coupled to one of the plurality of DACs and configured to select the delay wherein the delay by each of the delay lines is different.

The delays may be less that 10 μs or preferably less than 2 μs so that they are less than the period of the trap frequency for any ion.

The delay may be fractions (less than 1) of period t. Alternatively, it may be fractions (less than 1) of period T. This enables different delays, which are preferably a fraction of the period of the trap frequency to be selected. The processor can be configured to be an ion trap for a specific ion. One example would be that the ion trap is configured to be an ion trap for an Ytterbium ion and the delays are a fraction of the trap frequency for an Ytterbium ion.

There may be n delay lines, each delay line having a different delay of tx/n where x is a positive integer between 0 and n−1. As an alternative, there may be a non-linear arrangement of delays for a particular clock signal line.

The delay selection mechanism is coupled to a first DAC which is coupled to an electrode to apply a precisely timed voltage. There may be a primary buffer coupled between the clock and the delay lines. Additionally, there may be a secondary buffer arranged after the delay selection mechanism.

Each clock signal line may comprise a primary buffer, a plurality of delay lines coupled to the primary buffer and each configured to input a different delay of less than t and a delay selection mechanism configured to select the delay for a specific DAC. Each clock signal line receives a clock signal from a central clock.

There is preferably a controller wherein the controller controls the delay selection mechanism to select a delay line within each clock signal line.

Each DAC and electrode may have a corresponding primary buffer, plurality of delay lines, delay selection mechanism and wherein the clock outputs the same timing signal to each primary buffer. The processor may form part of a quantum computer.

According to the invention, there is provided a method for generating a timing signal in a trapped ion quantum processor, the trapped ion quantum processor comprising an ion trap having a plurality of DACs, each coupled to an electrode and the ion trap having a motional trap frequency of period t, the method comprising generating a clock signal of period T, generating a plurality of delays of less than t in a plurality of lines, each of the delays being a different fraction, of less than 1, of t, selecting one of the delays to add to the clock signal and transmitting the amended clock signal to one of the plurality of DACs.

The DACs may comprise DC DACs and RF DACs and the method may comprise the DC DACs applying DC signals to a plurality of the electrodes and the RF DACs applying an RF signal to a plurality of the electrodes.

DETAILED DESCRIPTION

Figure 1:
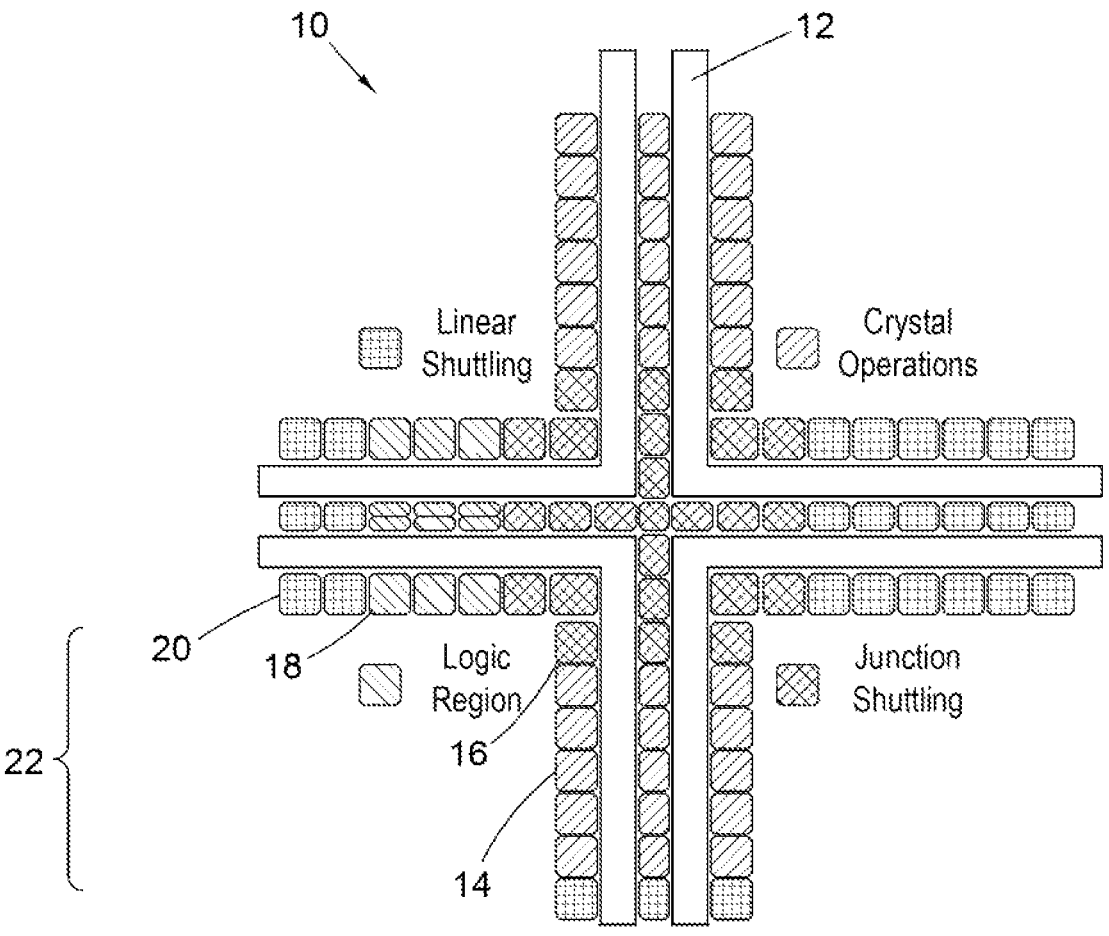
FIG. 1 depicts an array of electrodes used in conjunction with the invention.

Referring to FIG. 1, there is an example arrangement of electrodes used in conjunction with this invention. FIG. 1 shows an x-junction device 12 in a trapped ion quantum computer 10. The x-junction 12 comprises a plurality of electrodes 22 configured to trap an ion in an area of the x-junction device 12. Each electrode 22 is driven by a DAC to carry out the function of the area of the x-junction device 12. The x-junction device 12 is divided into areas. The areas of the x-junction device 12 can be divided into crystal operations 14, junction shuttling 16, logic region/gate zone 18 and linear shuttling 20 depending on the function being carried out in each area.

The x-junction is divided into four sections, a north section (above the center as depicted on FIG. 1), an east section (right of the center as depicted on FIG. 1), a south section (below the center as depicted on FIG. 1) and a west section (left of the center as depicted on FIG. 1). If there is no ion within the section, there may be no signal applied to any of the electrodes. Alternatively, there may be a signal, but no change in signal. Similarly, if an ion is being shuttled in from the left to the center, no signals may be applied to the electrodes in the north, east, or south sections.

The ion trap comprises both DC DACs and radio frequency (RF) DACs which apply signals to respective electrodes to control the position of an ion in three dimensions. The electrodes coupled to a DC DAC control the position of an ion in a longitudinal direction and the electrodes coupled to RF DACs control the position of an ion in axial directions. The RF electrodes typically emit a signal of 10-40 MHz.

The radio frequency signal may be in the range 10-40 MHZ, which generates an Axial trap frequency. For example, this might be 3 MHz.

The DC DAC's have a maximum Voltage: Vdac. The usable (or maximum) range of the DC electrodes controls the gradient of the potential well created and, therefore, the motional trap frequency (for a particular type of ion), which is the frequency at which the ion physically oscillates in the longitudinal direction. This may also be called secular frequency. A typical motional trap frequency may be in the range 100-1000 kHz and an illustrative example may be 500 kHz. The period of the motional trap frequency is given by t. Thus, the motional trap frequency is governed by the voltage gradient in a longitudinal direction.

An ion trap may be configured for a particular ion. Examples of ions used are $^{171}Yb^+$, $^{40}Ca^+$, $^{43}Ca^+$, $^9Be^+$, $Sr^+$, $Hg^+$. Thus, an ion trap may be configured for a particular ion. Alternatively, an ion trap can be configured with delays of less than 10 µs or less than 2 µs which would be a fraction of the motional trap frequency for any type of trapped ion.

Figure 2:
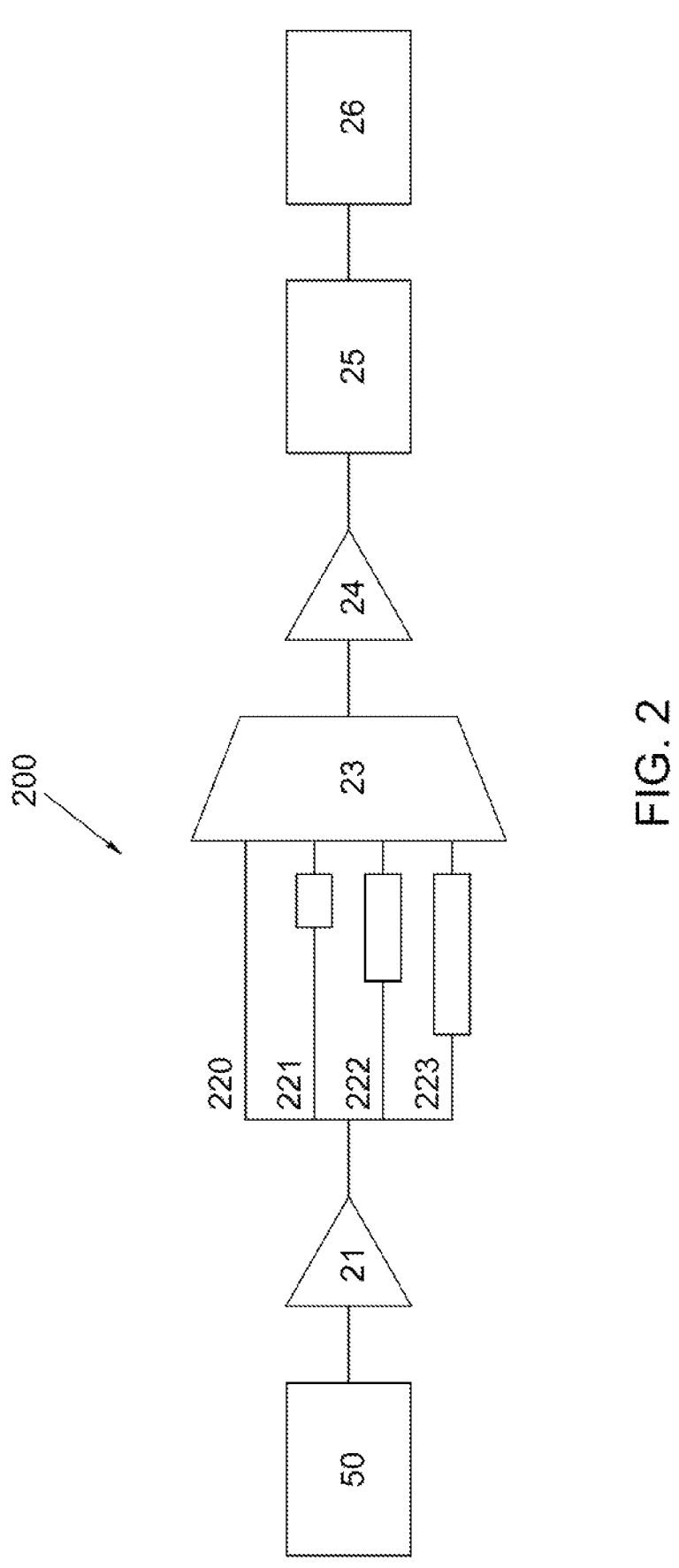
FIG. 2 depicts a clock delay line according to the invention.

FIG. 2 depicts a clock signal line 200 according to the invention. A clock 50 generates a clock signal. In this example, the clock frequency is 100 kHz, although alternative clock frequencies may be used according to the application. The clock signal is a pulse signal, although other signals can be used.

The clock signal is fed to a buffer 21 and then divided into a plurality of clock delay lines 220, 221, 222, and 223. Each of these clock delay lines introduces a delay which is a fraction of the period of the motional trap frequency t. In the present embodiment, a first delay line 220 introduces no delay, a second delay line 221 introduces a delay of 0.5 µs, a third delay line introduces a delay of 1 µs and a third delay line introduces a delay of 1.5 µs. Using a delay that is a fraction of the motional trap frequency allows the signal to be synchronized to a specific point on the trap oscillation and therefore allows any signals, imparted to the trapped ion qubit, to be timed accurately relative to the oscillation of the trapped ion qubit. Using a suitable delay can ensure that any gate functions are applied diabatically.

The present embodiment uses four delay lines, but any number of delay lines can be used in order to generate the correct delay. In the present embodiment delays introduced by the different delay lines are evenly divided i.e. for n delay lines operating in a system with a motional trap frequency of period t each delay line has a delay of $(x/n)t$ for $0 \le x \le n-1$. However, an alternative, non-linear distribution of delays could be used and the different delays selected as necessary. For example, if a delay of $5t/7$ is necessary for diabatic application.

There is then a delay selector 23 which selects which delay line is used and transmitted to a second clock buffer 24. The delay selector is controlled by a controller 60 which controls which delay line is selected.

The resulting delayed clock signal is transmitted to a DAC 25 which controls an electrode 26.

Figure 3:
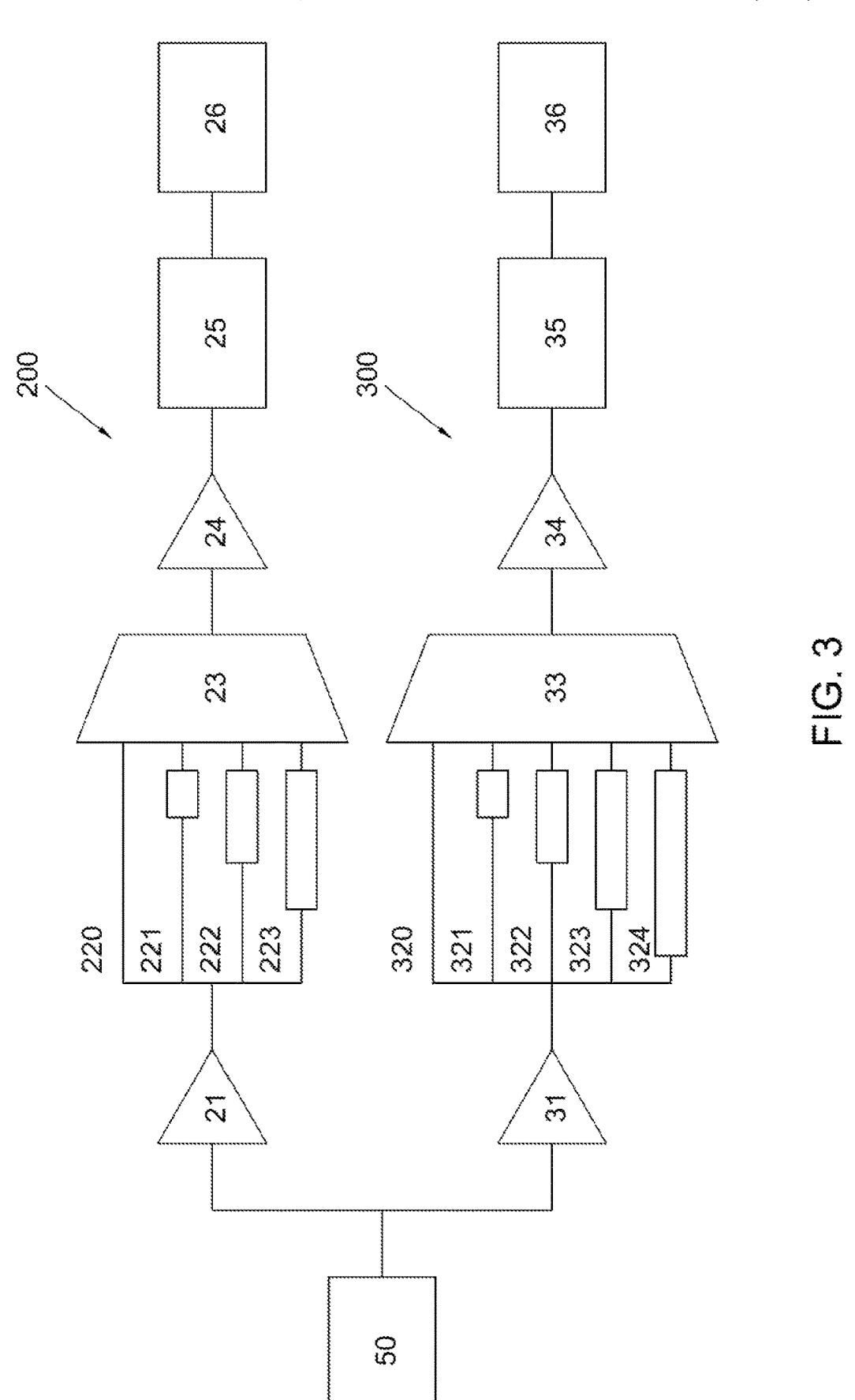
FIG. 3 depicts an arrangement according to the invention.

FIG. 3 depicts an arrangement in which a single clock 50 signal is transmitted to two different clock signal lines. The first clock signal line 200 has four clock delay lines (as depicted in FIG. 2) and the second clock signal line 300 has five clock delay lines 320, 321, 322, 323, and 324 with delay of 0, 0.4 µs, 0.8 µs, 1.2 µs and 1.6 µs.

Each clock signal line has a first buffer 21, 31 and a delay selector 23, 33. The delay selector for each line is controlled by the controller 60. The controller 60 controls each clock signal line independently.

Each clock signal line control transmits a signal to a different DAC 25, 35 which transmits a voltage signal to a different electrode 26, 36. Although the same clock signal is used, different fractional delays can be applied to different clock signal lines and therefore different timing applied to different electrodes. For example, when an ion is being shuttled between gate zones different timings need to be applied to different electrodes along the path of the ion. The present invention allows precision timing (to a greater accuracy than that allowed by the clock signal) to be applied to each electrode, and, thus, applied to the trapped ion.

The greater the number of the delay lines the more different timing delays can be applied to a clock signal line. Although more delay lines may result in a larger number of different precision timing possibilities, an alternative is to include only clock delay lines with delays which will be used. For example, FIG. 1 depicts a series of electrodes and different delays could be used in the clock signal lines for each electrode along the path.

The embodiments described above use a delay selector arranged after the delay lines. However, an alternative would be to arrange the delay selector between the first buffer and the delay lines, and this would avoid the clock signal always being transmitted down all the delay lines thus reducing the noise in the system.

"And/or" where used herein is to be taken as specific disclosure of each of the two specified features or components with or without the other. For example, "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

What is claimed is:

1. A quantum computer comprising:
a quantum processor communicatively coupled to:
  (a) a clock, wherein the clock is configured to transmit a clock signal;
  (b) a plurality of delay signal lines, wherein each delay signal line in the plurality of delay signal lines is configured to receive the clock signal and add a different delay to the clock signal to generate an amended clock signal, thereby forming a plurality of amended clock signals; and
  (c) a delay selection mechanism, wherein the delay selection mechanism is coupled to a digital-to-analog converter (DAC), and wherein the delay selection mechanism is configured to select an amended clock signal from the plurality of amended clock signals to be applied to the DAC and to control the timing of a gate operation.

2. The system of claim 1, wherein the clock signal is a pulse signal.

3. The system of claim 1, further comprising a buffer, wherein the buffer is configured to transmit the clock signal to each delay signal line of the plurality of delay signal lines.

4. The system of claim 1, wherein each delay associated with the plurality of delay signal lines is less than 10 μs.

5. The system of claim 1, further comprising an ion trap, wherein the ion trap comprises the DAC and an electrode, wherein the electrode corresponds to the DAC.

6. The system of claim 5, wherein the ion trap is configured to have a motional trap frequency of period t.

7. The system of claim 6, wherein the amended clock signal is less than 't'.

8. The system of claim 7, wherein the delay of each delay signal line in the plurality of delay signal lines is t*x/n, wherein 'n' is a number of delay signal lines and 'x' is a positive integer between 0 and n−1.

9. The system of claim 5, wherein the ion trap further comprises a plurality of DACs, wherein each DAC of the plurality of DACs has a corresponding electrode, plurality of delay lines, and delay selection mechanism, and wherein the clock is configured to output substantially the same timing signal to each delay line in each plurality of delay lines.

10. The system of claim 9, wherein the ion trap comprises direct current (DC) DACs and radio frequency (RF) DACs.

11. The system of claim 6, wherein the motional trap frequency is from about 100 kHz to about 1000 kHz.

12. The system of claim 10, wherein the RF electrodes are configured to emit a signal having a frequency of about 10 MHz to about 40 MHz.

13. The system of claim 9, wherein the electrodes are arranged in an x-junction device.

14. The system of claim 13, wherein x-junction device comprises a plurality of areas, and wherein the electrodes are configured to trap an ion in an area of the plurality of areas of the x-junction device.

15. The system of claim 14, wherein the area of the x-junction device is a crystal operations area, junction shuttling area, logic region/gate zone area, or linear shuttling area.

16. The system of claim 13, wherein the x-junction device comprises four sections.

17. The system of claim 16, wherein the system is configured to selectively apply a signal to a section of the four sections based at least in part on an occupancy of an ion in the section.

18. The system of claim 5, wherein the ion trap is configured to trap an ion selected from the group consisting of $^{171}Yb^+$, $^{40}Ca^+$, $^{43}Ca^+$, $^9Be^+$, $Sr^+$, and $Hg^+$.

19. A method comprising:
  (a) generating a plurality of clock signals;
  (b) adding a different delay to each clock signal in the plurality of clock signals to generate a plurality of amended clock signals;
  (c) selecting, by a delay selection mechanism, an amended clock signal from the plurality of amended clock signals; and
  (d) applying the amended clock signal to a digital-to-analog converter (DAC), wherein the DAC is configured to control a gate operation in a quantum processor.

20. The method of claim 19, wherein adding a different delay to each clock signal in (b) is performed, at least in part, using a plurality of delay signal lines.

21. The method of claim 20, wherein adding a different delay to each clock signal in (b) further comprises a buffer configured to transmit each clock signal of the plurality of clock signals to a delay signal line of the plurality of delay signal lines.

22. The method of claim 19, wherein the quantum processor comprises an ion trap.

23. The method of claim 22, wherein the ion trap is configured to have a motional trap frequency of period t.

24. The method of claim 23, wherein the amended clock signal is less than 't'.

25. The method of claim 24, wherein adding a different delay to each clock signal in (b) comprises a delay of t * x/n, wherein 'n' is a number of delay signal lines of the plurality of delay signal lines and 'x' is a positive integer between 0 and n-1.

26. The method of claim 22, wherein the ion trap further comprises a plurality of DACs, wherein each DAC of the plurality of DACs has a corresponding electrode, plurality of delay lines, and delay selection mechanism, the method further comprising outputting substantially the same timing signal to each delay line in each plurality of delay lines.

27. The method of claim 26, wherein the electrodes are arranged in an x-junction device.

28. The method of claim 27, wherein x-junction device comprises a plurality of areas, the method further comprising trapping, using the electrodes, an ion in an area of the plurality of areas of the x-junction device.

29. The method of claim 28, wherein the area of the x-junction device is a crystal operations area, junction shuttling area, logic region/gate zone area, or linear shuttling area.

* * * * *